(12) United States Patent
Lee et al.

(10) Patent No.: US 9,803,525 B2
(45) Date of Patent: Oct. 31, 2017

(54) EXHAUST PURIFICATION DEVICE AND METHOD OF CALCULATING NOX MASS ADSORBED IN LEAN NOX TRAP OF EXHAUST PURIFICATION DEVICE

(71) Applicants: HYUNDAI MOTOR COMPANY, Seoul (KR); FEV GMBH

(72) Inventors: Jin Ha Lee, Seoul (KR); Jin Woo Park, Suwon-si (KR); Sera Lim, Hwaseong-si (KR); Joschka Schaub, Aachen (DE); Thomas Wittka, Kornelimünster (DE); Alexander Vovk, Aachen (DE)

(73) Assignees: HYUNDAI MOTOR COMPANY, Seoul (KR); FEV GMBH, Aachen (DE)

(*) Notice: Subject to any disclaimer, the term of this patent is extended or adjusted under 35 U.S.C. 154(b) by 14 days.

(21) Appl. No.: 14/956,245

(22) Filed: Dec. 1, 2015

(65) Prior Publication Data

US 2016/0290272 A1    Oct. 6, 2016

(30) Foreign Application Priority Data

Mar. 30, 2015  (KR) .......................... 10-2015-0044459

(51) Int. Cl.
*F01N 3/00* (2006.01)
*F01N 3/02* (2006.01)
(Continued)

(52) U.S. Cl.
CPC .......... *F01N 3/0842* (2013.01); *F01N 3/0871* (2013.01); *F01N 3/208* (2013.01);
(Continued)

(58) Field of Classification Search
CPC ...... F01N 3/0842; F01N 3/0871; F01N 3/208; F01N 250/025; F01N 250/026; F01N 250/06; F01N 250/08; F01N 250/14; F01N 2610/02; F01N 2900/1402; F01N 2900/1404; F01N 2900/1406;
(Continued)

(56) References Cited

U.S. PATENT DOCUMENTS

| 2009/0000274 A1 | 1/2009 | Stroh |
| 2012/0137661 A1* | 6/2012 | Lee ........................ F01N 3/0253 60/286 |

FOREIGN PATENT DOCUMENTS

| KR | 10-2012-0060372 A | 6/2012 |
| KR | 10-2012-0060633 A | 6/2012 |

* cited by examiner

*Primary Examiner* — Mark Laurenzi
*Assistant Examiner* — Dapinder Singh
(74) *Attorney, Agent, or Firm* — McDermott Will & Emery LLP

(57) ABSTRACT

A method of calculating a nitrogen oxide (NOx) mass adsorbed in a lean NOx trap (LNT) of an exhaust purification device includes calculating a NOx mass flow stored in the LNT, calculating a NOx mass flow thermally released from the LNT, calculating a NOx mass flow released from the LNT at the rich air/fuel ratio, calculating a NOx mass flow chemically reacting with the reductant at the LNT, and integrating a value obtained by subtracting the NOx mass flow thermally released from the LNT, the NOx mass flow released from the LNT at the rich air/fuel ratio, and the NOx mass flow chemically reacting with the reductant at the LNT from the NOx mass flow stored in the LNT.

17 Claims, 6 Drawing Sheets

(51) Int. Cl.
*F01N 3/10* (2006.01)
*F01N 3/20* (2006.01)
*F01N 3/08* (2006.01)
F02D 41/14 (2006.01)
F02D 41/38 (2006.01)
F02D 41/02 (2006.01)

(52) U.S. Cl.
CPC ..... *F02D 41/1441* (2013.01); *F02D 41/1454* (2013.01); *F02D 41/1463* (2013.01); *F02D 41/3827* (2013.01); F01N 2560/025 (2013.01); F01N 2560/026 (2013.01); F01N 2560/06 (2013.01); F01N 2560/08 (2013.01); F01N 2560/14 (2013.01); F01N 2610/02 (2013.01); F01N 2900/1402 (2013.01); F01N 2900/1404 (2013.01); F01N 2900/1406 (2013.01); F01N 2900/1602 (2013.01); F01N 2900/1614 (2013.01); F02D 41/0275 (2013.01); F02D 2200/0802 (2013.01); F02D 2200/0806 (2013.01); F02D 2250/36 (2013.01); Y02T 10/24 (2013.01)

(58) Field of Classification Search
CPC ... F01N 2900/1602; F01N 2900/16146; F02D 41/1454; F02D 41/1463; F02D 41/3827; F02D 41/0275; F02D 2200/0802; F02D 2200/0806; F02D 2250/36
USPC .......................... 60/274, 277, 295, 299–301
See application file for complete search history.

EXHAUST PURIFICATION DEVICE AND METHOD OF CALCULATING NOX MASS ADSORBED IN LEAN NOX TRAP OF EXHAUST PURIFICATION DEVICE

CROSS-REFERENCE TO RELATED APPLICATION

This application claims the benefit of priority to Korean Patent Application No. 10-2015-0044459, filed with the Korean Intellectual Property Office on Mar. 30, 2015, the entire contents of which are incorporated herein by reference.

TECHNICAL FIELD

The present disclosure relates to a method of calculating a NOx mass adsorbed in a lean NOx trap (LNT) of an exhaust purification device, and the exhaust purification device. More particularly, the present disclosure relates to a method of calculating a NOx mass adsorbed in an LNT and an exhaust purification device that improves a purification efficiency of the NOx and fuel efficiency by precisely calculating the NOx mass adsorbed in the LNT.

BACKGROUND

Generally, exhaust gas flowing out from an engine through an exhaust manifold is driven into a catalytic converter mounted at an exhaust pipe, and is purified therein. After, the noise of the exhaust gas is decreased while passing through a muffler and then the exhaust gas is emitted into the air through a tail pipe. The catalytic converter purifies pollutants contained in the exhaust gas. In addition, a particulate filter for trapping particulate matter (PM) contained in the exhaust gas is mounted in the exhaust pipe.

A denitrification catalyst (DeNOx catalyst) is one type of such a catalytic converter and purifies nitrogen oxide (NOx) contained in the exhaust gas. If reducing agents such as urea, ammonia, carbon monoxide, and hydrocarbons (HC) are supplied to the exhaust gas, the NOx contained in the exhaust gas is reduced in the DeNOx catalyst through oxidation-reduction reactions with the reducing agents.

Recently, a lean NOx trap (LNT) catalyst has been used as such a DeNOx catalyst. The LNT catalyst adsorbs the NOx contained in the exhaust gas when air/fuel ratio is lean, and releases the adsorbed NOx and reduces the released nitrogen oxide and the nitrogen oxide contained in the exhaust gas when the air/fuel ratio is rich.

Since diesel engines are operated at the lean air/fuel ratio, however, it is required to artificially adjust air/fuel ratio to be the rich air/fuel ratio in order to release the adsorbed NOx from the LNT. For this purpose, a precise timing for released the NOx adsorbed in the LNT should be determined. Particularly, a NOx mass adsorbed in the LNT should be precisely determined to improve a NOx purification efficiency of the LNT and fuel economy, and to prevent degradation of the LNT.

The above information disclosed in this Background section is only for enhancement of understanding of the background of the disclosure and therefore it may contain information that does not form the prior art that is already known in this country to a person of ordinary skill in the art.

SUMMARY OF THE DISCLOSURE

The present disclosure has been made in an effort to provide a method of calculating a NOx mass adsorbed in an LNT and an exhaust purification device having advantages of improving NOx purification efficiency and fuel economy and preventing degradation of the LNT by precisely calculating the NOx mass adsorbed in the LNT.

An exhaust purification device according to an exemplary embodiment of the present disclosure may include a lean NOx trap (LNT). The LNT may be mounted at an exhaust pipe, and may be configured to adsorb NOx contained in an exhaust gas at a lean air/fuel ratio, to release the adsorbed NOx at a rich air/fuel ratio, and to reduce the NOx contained in the exhaust gas or the released NOx using reductant including carbon or hydrogen contained in the exhaust gas.

The method of calculating the NOx mass adsorbed in the LNT may include: calculating a NOx mass flow stored in the LNT; calculating a NOx mass flow thermally released from the LNT; calculating a NOx mass flow released from the LNT at the rich air/fuel ratio; calculating a NOx mass flow chemically reacting with the reductant at the LNT; and integrating a value obtained by subtracting the NOx mass flow thermally released from the LNT, the NOx mass flow released from the LNT at the rich air/fuel ratio, and the NOx mass flow chemically reacting with the reductant at the LNT from the NOx mass flow stored in the LNT.

The calculating a NOx mass flow stored in the LNT may include: calculating a NOx mass flow flowing into the LNT; calculating a NOx storing efficiency of the LNT; and calculating a NOx mass flow adsorbed in the LNT by multiplying the NOx mass flow flowing into the LNT and the NOx storing efficiency of the LNT, wherein a NOx storing efficiency at the rich air/fuel ratio and a NOx storing efficiency at the lean air/fuel ratio are calculated respectively at the calculating a NOx storing efficiency of the LNT.

The NOx storing efficiency at the rich air/fuel ratio may be calculated according to a temperature of the LNT and a mass flow of the exhaust gas passing through the LNT.

The NOx storing efficiency at the lean air/fuel ratio may be calculated according to a temperature of the LNT and a relative NOx adsorption of the LNT.

The NOx storing efficiency at the lean air/fuel ratio may be firstly corrected according to the temperature of the LNT and the mass flow of the exhaust gas passing through the LNT, and may be secondly corrected according to a NOx adsorption in the LNT and the mass flow of the exhaust gas passing through the LNT.

The NOx storing efficiency at the rich air/fuel ratio and the NOx storing efficiency at the lean air/fuel ratio may be calculated by taking into account an aging factor of the LNT.

The calculating a NOx mass flow thermally released from the LNT may include: calculating an excess NOx adsorption that exceeds a maximum NOx adsorption in the LNT; calculating a mass flow of the excess NOx adsorption by dividing the excess NOx adsorption by a sampling time; and multiplying a thermal release characteristic according to the temperature of the LNT to the mass flow of the excess NOx adsorption.

The calculating a NOx mass flow released from the LNT at the rich air/fuel ratio may include: calculating a mass flow of a basic NOx release according to a NOx adsorption at a denitrification (DeNOx) mode; firstly correcting the mass flow of the basic NOx release according to the temperature of the LNT and the mass flow of the exhaust gas passing through the LNT; and secondly correcting the firstly corrected mass flow of the basic NOx release according to an aging factor of the LNT.

The NOx mass flow chemically reacting with the reductant at the LNT may be calculated through a model using $C_3H_6$ as the reductant.

An exhaust purification device according to an exemplary embodiment of the present disclosure may include: an engine including an injector for injecting fuel thereinto, generating power by burning mixture of air and the fuel, and exhausting the exhaust gas generated at combustion process to the exterior thereof through an exhaust pipe; a lean NOx trap (LNT) mounted on the exhaust pipe, and configured to adsorb nitrogen oxide (NOx) contained in the exhaust gas at a lean air/fuel ratio, to release the adsorbed nitrogen oxide at a rich air/fuel ratio, and to reduce the nitrogen oxide contained in the exhaust gas or the released nitrogen oxide using reductant including carbon or hydrogen contained in the exhaust gas; and a controller configured to control adsorption and release of the NOx by controlling air/fuel ratio according to the NOx adsorbed in the LNT and a temperature of the exhaust gas, wherein the controller calculates a NOx mass adsorbed in the LNT by integrating a value obtained by subtracting a NOx mass flow thermally released from the LNT, a NOx mass flow released from the LNT at the rich air/fuel ratio, and a NOx mass flow chemically reacting with reductant at the LNT from a NOx mass flow stored in the LNT.

The controller may calculate the NOx mass flow stored in the LNT by multiplying NOx mass flow flowing into the LNT and a NOx storing efficiency of the LNT.

The controller may calculate a NOx storing efficiency at the rich air/fuel ratio and a NOx storing efficiency at the lean air/fuel ratio, respectively.

The controller may calculate the NOx storing efficiency at the rich air/fuel ratio according to the temperature of the LNT and a mass flow of the exhaust gas passing through the LNT.

The controller may calculate the NOx storing efficiency at the lean air/fuel ratio according to the temperature of the LNT and a relative NOx adsorption of the LNT.

The controller may firstly correct the NOx storing efficiency at the lean air/fuel ratio according to the temperature of the LNT and the mass flow of the exhaust gas passing through the LNT, and may secondly correct the NOx storing efficiency at the lean air/fuel ratio according to a NOx adsorption in the LNT and the mass flow of the exhaust gas passing through the LNT.

The controller may calculate a NOx storing efficiency at the rich air/fuel ratio and a NOx storing efficiency at the lean air/fuel ratio by considering the aging factor of the LNT.

The controller may calculate a mass flow of an excess NOx adsorption by dividing an excess NOx adsorption that exceeds a maximum NOx adsorption of the LNT by a sampling time, and may calculate the NOx mass flow thermally released from the LNT by multiplying a thermal release characteristic according to the temperature of the LNT to the mass flow of the excess NOx adsorption.

The controller may calculate the NOx mass flow released from the LNT at the rich air/fuel ratio by firstly correcting a mass flow of a basic NOx release according to a NOx adsorption at a denitrification (DeNOx) mode according to the temperature of the LNT and the mass flow of the exhaust gas passing through the LNT, and secondly correcting the mass flow of the basic NOx release according to the aging factor of the LNT.

The controller may calculate the NOx mass flow chemically reacting with the reductant at the LNT through a model using C3H6 as the reductant.

As described above, a timing for releasing the NOx from the LNT may be suitably controlled by precisely calculating the NOx mass adsorbed in the LNT according to the present disclosure. Therefore, NOx purification efficiency may be improved and degradation of the LNT may be prevented.

In addition, fuel economy may be improved by preventing unnecessary release of the NOx.

DETAILED DESCRIPTION

Exemplary embodiments of the present disclosure will hereinafter be described in detail with reference to the accompanying drawings.

Figure 1:
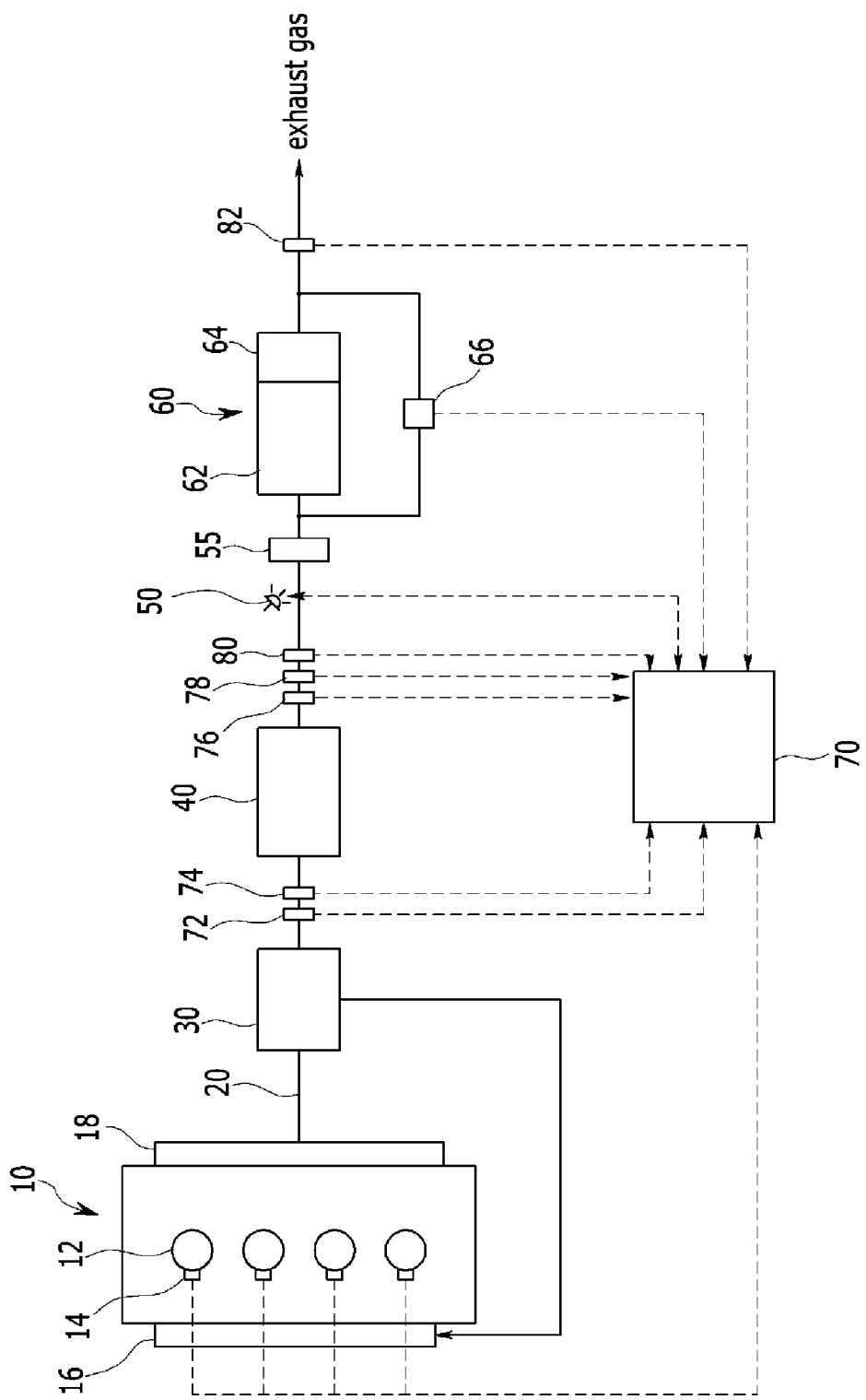
FIG. 1 is a schematic diagram of an exhaust purification device according to an exemplary embodiment of the present disclosure.

FIG. 1 is a schematic diagram of an exhaust purification device according to an exemplary embodiment of the present disclosure.

As shown in FIG. 1, an exhaust system for an internal combustion engine may include an engine 10, an exhaust pipe 20, an exhaust gas recirculation (EGR) apparatus 30, a lean NOx trap (LNT) 40, a dosing module 50, a particulate filter 60, and a controller 70.

The engine 10 burns air/fuel mixture in which fuel and air are mixed so as to convert chemical energy into mechanical energy. The engine 10 is connected to an intake manifold 16 so as to receive the air in a combustion chamber 12, and is connected to an exhaust manifold 18 such that exhaust gas generated in combustion process is gathered in the exhaust manifold 18 and is exhausted to the exterior. An injector 14 is mounted in the combustion chamber 12 so as to inject the fuel into the combustion chamber 12.

A diesel engine is exemplified herein, but a lean-burn gasoline engine may be used. In a case that the gasoline engine is used, the air/fuel mixture flows into the combustion chamber 12 through the intake manifold 16, and a spark plug (not shown) is mounted at an upper portion of the combustion chamber 12. In addition, if a gasoline direct injection (GDI) engine is used, the injector 14 is mounted at the upper portion of the combustion chamber 12.

The exhaust pipe 20 is connected to the exhaust manifold 18 so as to exhaust the exhaust gas to the exterior of a vehicle. The LNT 40, the dosing module 50, and the particulate filter 60 are mounted on the exhaust pipe 20 so as to remove hydrocarbons, carbon monoxide, particulate matter, and nitrogen oxide (NOx) contained in the exhaust gas.

The exhaust gas recirculation apparatus 30 is mounted on the exhaust pipe 20, and a portion of the exhaust gas exhausted from the engine 10 is supplied back to the engine 10 through the exhaust gas recirculation apparatus 30. In addition, the exhaust gas recirculation apparatus 30 is connected to the intake manifold 16 so as to control combustion temperature by mixing a portion of the exhaust gas with the air. Such control of the combustion temperature is performed by controlling an amount of the exhaust gas supplied back to the intake manifold 16 by control of the controller 70. Therefore, a recirculation valve (not shown) controlled by the controller 70 may be mounted on a line connecting the exhaust gas recirculation apparatus 30 and the intake manifold 16.

A first oxygen sensor 72 is mounted on the exhaust pipe 20 downstream of the exhaust gas recirculation apparatus 30. The first oxygen sensor 72 detects an oxygen amount in the exhaust gas passing through the exhaust gas recirculation apparatus 30 and transmits a signal corresponding thereto to the controller 70 so as to help lean/rich control of the exhaust gas performed by the controller 70. In this specification, the detected value by the first oxygen sensor 72 is called air/fuel ratio (lambda) at an upstream of the LNT.

In addition, a first temperature sensor 74 is mounted on the exhaust pipe 20 downstream of the exhaust gas recirculation apparatus 30 and detects a temperature of the exhaust gas passing through the exhaust gas recirculation apparatus 30.

The LNT 40 is mounted on the exhaust pipe 20 downstream of the exhaust gas recirculation apparatus 30. The LNT 40 adsorbs the nitrogen oxide (NOx) contained in the exhaust gas at a lean air/fuel ratio, and releases the adsorbed nitrogen oxide and reduces the nitrogen oxide contained in the exhaust gas or the released nitrogen oxide at a rich air/fuel ratio. In addition, the LNT 40 may oxidize carbon monoxide (CO) and hydrocarbons (HC) contained in the exhaust gas.

Herein, the hydrocarbon represents all compounds consisting of carbon and hydrogen contained in the exhaust gas and the fuel.

A second oxygen sensor 76, a second temperature sensor 78, and a first NOx sensor 80 may be mounted on the exhaust pipe 20 downstream of the LNT 40.

The second oxygen sensor 76 detects an oxygen amount contained in exhaust gas flowing into the particulate filter 60 and transmits a signal corresponding thereto to the controller 70. The controller 70 may perform the lean/rich control of the exhaust gas based on the detected values by the first oxygen sensor 72 and the second oxygen sensor 76. In this specification, the detected value by the second oxygen sensor 62 is called air/fuel ratio (lambda) at an upstream of the filter.

The second temperature sensor 78 detects a temperature of the exhaust gas flowing into the particulate filter 60 and transmits a signal corresponding thereto to the controller 70.

The first NOx sensor 80 detects a NOx concentration contained in the exhaust gas flowing into the particulate filter 60 and transmits a signal corresponding thereto to the controller 70. The NOx concentration detected by the first NOx sensor 80 may be used to determine an amount of a reducing agent injected by the dosing module 50.

The dosing module 50 is mounted on the exhaust pipe 20 upstream of the particulate filter 60 and injects the reducing agent into the exhaust gas by control of the controller 70. Typically, the dosing module 50 injects urea and the injected urea is hydrolyzed and converted into ammonia. However, the reducing agent is not limited to the ammonia.

A mixer 55 is mounted on the exhaust pipe 20 downstream of the dosing module 50 and mixes the reducing agent and the exhaust gas evenly.

The particulate filter 60 is mounted on the exhaust pipe downstream of the mixer 55, traps particulate matter contained in the exhaust gas, and reduces the nitrogen oxide contained in the exhaust gas using the reducing agent injected by the dosing module 50. For these purposes, the particulate filter 60 includes a selective catalytic reduction catalyst on a diesel particulate filter (SDPF) 62 and an additional selective catalytic reduction (SCR) catalyst 64, but is not limited thereto.

It is to be understood that an SCR catalyst in this specification and these claims include the SCR catalyst itself or the SDPF.

The SDPF 62 is formed by coating the SCR on walls defining channels of the DPF. Generally, the DPF includes a plurality of inlet channels and outlet channels. Each of the inlet channels includes an end that is open and another end that is blocked, and receives the exhaust gas from a front end of the DPF. In addition, each of the outlet channels includes an end that is blocked and another end that is open, and discharges the exhaust gas from the DPF. The exhaust gas flowing into the DPF through the inlet channels enters the outlet channels through porous walls separating the inlet channels and the outlet channels. After that, the exhaust gas is discharged from the DPF through the outlet channels. When the exhaust gas passes through the porous walls, the particulate matter contained in the exhaust gas is trapped. In addition, the SCR catalyst coated on the SDPF 62 reduces the nitrogen oxide contained in the exhaust gas using the reducing agent injected by the dosing module 50.

The additional SCR catalyst 64 is mounted at the rear of the SDPF 62. The additional SCR catalyst 64 further reduces the nitrogen oxide if the SDPF 62 purifies the nitrogen oxide completely. The additional SCR catalyst 64 may be mounted physically apart from the SDPF 62.

Meanwhile, a pressure difference sensor 66 is mounted on the exhaust pipe 20. The pressure difference sensor 66 detects pressure difference between a front end portion and a rear end portion of the particulate filter 60, and transmits a signal corresponding thereto to the controller 70. The controller 70 may control the particulate filter 60 to be regenerated if the pressure difference detected by the pressure difference sensor 66 is greater than a predetermined pressure. In this case, the injector 14 post-injects the fuel so as to burn the particulate matter trapped in the particulate filter 60.

In addition, a second NOx sensor 82 is mounted on the exhaust pipe 20 downstream of the particulate filter 60. The second NOx sensor 82 detects a concentration of the nitrogen oxide contained in the exhaust gas exhausted from the particulate filter 60, and transmits a signal corresponding thereto to the controller 70. The controller 70 can check based on the detected value by the second NOx sensor 82 whether the nitrogen oxide contained in the exhaust gas is normally removed in the particulate filter 60. That is, the second NOx sensor 82 may be used to evaluate performance of the particulate filter 60.

The controller 70 determines a driving condition of the engine based on the signals transmitted from each sensor, and performs the lean/rich control and controls the amount of the reducing agent injected by the dosing module 50 based on the driving condition of the engine. For example, the controller 70 may remove nitrogen oxide from the LNT 40 (in this specification, it will be called 'release of LNT') by controlling the air/fuel ratio to be a rich atmosphere, and may remove nitrogen oxide from the SDPF 60 by injecting reducing agent. The lean/rich control may be performed by controlling a fuel amount injected by the injector 14.

The controller 70 is provided with a plurality of maps, characteristics of the LNT, and correction coefficients (or factors) stored therein, and may calculate a NOx mass adsorbed in the LNT based on the plurality of maps, characteristics of the LNT, and correction coefficients (or factors). The plurality of maps, characteristics of the LNT, and correction coefficient may be set through a number of experiments.

In addition, the controller 70 controls regeneration of the particulate filter 60 and desulfurization of the LNT 40.

For these purposes, the controller 70 can be realized by one or more processors activated by a predetermined program, and the predetermined program can be programmed to perform each step of a method of calculating a NOx mass adsorbed in an LNT according to an exemplary embodiment of the present disclosure.

Figure 2:
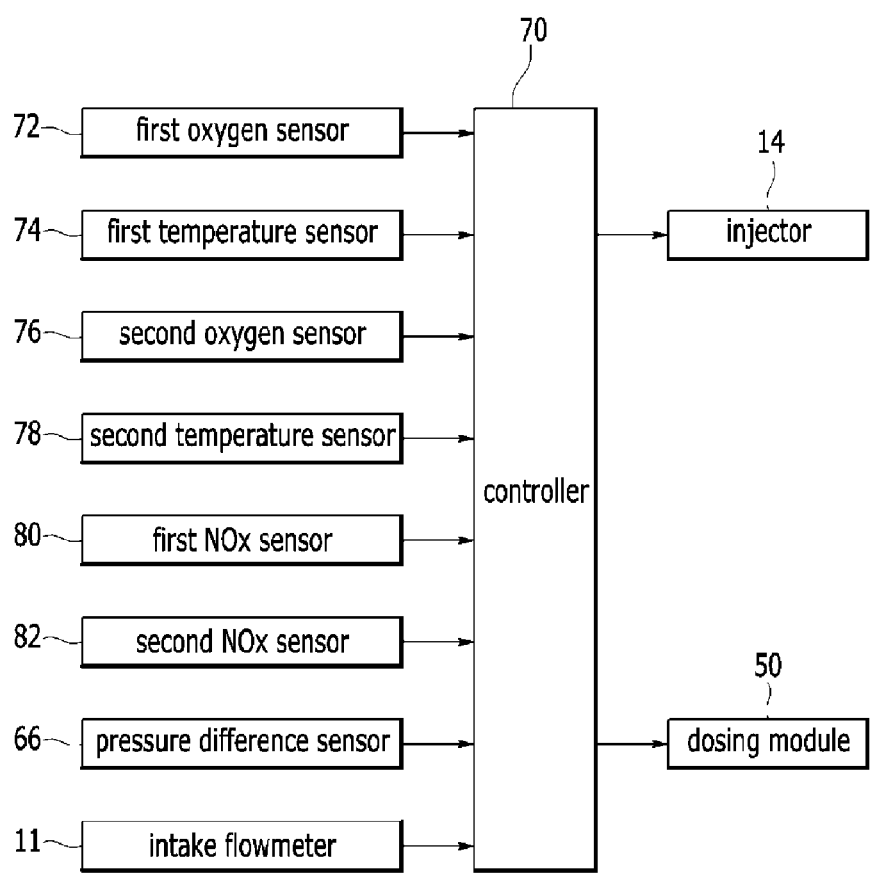
FIG. 2 is a block diagram illustrating a relationship of an input and output of a controller used in a method of calculating a NOx mass adsorbed in an LNT applicable to an exhaust purification device according to an exemplary embodiment of the present disclosure.

FIG. 2 is a block diagram illustrating a relationship of an input and output of a controller used in a method of calculating a NOx mass adsorbed in an LNT applicable to an exhaust purification device according to an exemplary embodiment of the present disclosure.

As shown in FIG. 2, the first oxygen sensor 72, the first temperature sensor 74, the second oxygen sensor 76, the second temperature sensor 78, the first NOx sensor 80, the second NOx sensor 82, the pressure difference sensor 66 and an intake flowmeter 11 are electrically connected to the controller 70, and transmit the detected values to the controller 70.

The first oxygen sensor 72 detects the oxygen amount in the exhaust gas passing through the exhaust gas recirculation apparatus 30 and transmits the signal corresponding thereto to the controller 70. The controller 70 may perform the lean/rich control of the exhaust gas based on the oxygen amount in the exhaust gas detected by the first oxygen sensor 72. The detected value by the first oxygen sensor 72 may be represented as lambda ($\lambda$). The lambda means a ratio of actual air/fuel ratio to stoichiometric air/fuel ratio. If the lambda is greater than 1, the air/fuel ratio is lean. On the contrary, the air/fuel ratio is rich if the lambda is smaller than 1.

The first temperature sensor 74 detects the temperature of the exhaust gas passing through the exhaust gas recirculation apparatus 30 and transmits the signal corresponding thereto to the controller 70.

The second oxygen sensor 76 detects the oxygen amount in the exhaust gas flowing into the particulate filter 60 and transmits the signal corresponding thereto to the controller 70.

The second temperature sensor 78 detects the temperature of the exhaust gas flowing into the particulate filter 60 and transmits the signal corresponding thereto to the controller 70.

The first NOx sensor 80 detects the NOx concentration contained in the exhaust gas flowing into the particulate filter 60 and transmits the signal corresponding thereto to the controller 70.

The second NOx sensor 82 detects the NOx concentration contained in the exhaust gas exhausted from the particulate filter 60 and transmits the signal corresponding thereto to the controller 70.

The pressure difference sensor 66 detects the pressure difference between a front end portion and a rear end portion of the particulate filter 60 and transmits the signal corresponding thereto to the controller 70.

The intake flowmeter 11 detects an intake air flow supplied to an intake system of the engine 10 and transmits the signal corresponding thereto to the controller 70.

The controller 70 determines the driving condition of the engine, fuel injection amount, fuel injection timing, fuel injection pattern, injection amount of the reducing agent, regeneration timing of the particulate filter 60, and desulfurization/regeneration timing of the LNT 40 based on the transmitted value, and outputs a signal for controlling the injector 14 and the dosing module 50 to the injector 14 and the dosing module 50. In addition, the controller 70 calculates the NOx mass adsorbed in the LNT 40 on the basis of the transmitted value.

Meanwhile, a plurality of sensors other than the sensors illustrated in FIG. 2 may be mounted in the exhaust purification device according to the exemplary embodiment of the present disclosure. For better comprehension and ease of description, however, description of the plurality of sensors will be omitted.

Hereinafter, referring to FIG. 3 to FIG. 6, a method of calculating a NOx mass adsorbed in an LNT according to an exemplary embodiment of the present disclosure will be described in detail.

FIG. 3 to FIG. 6 are flowcharts of a method of calculating a NOx mass adsorbed in an LNT according to an exemplary embodiment of the present disclosure.

Figure 3:
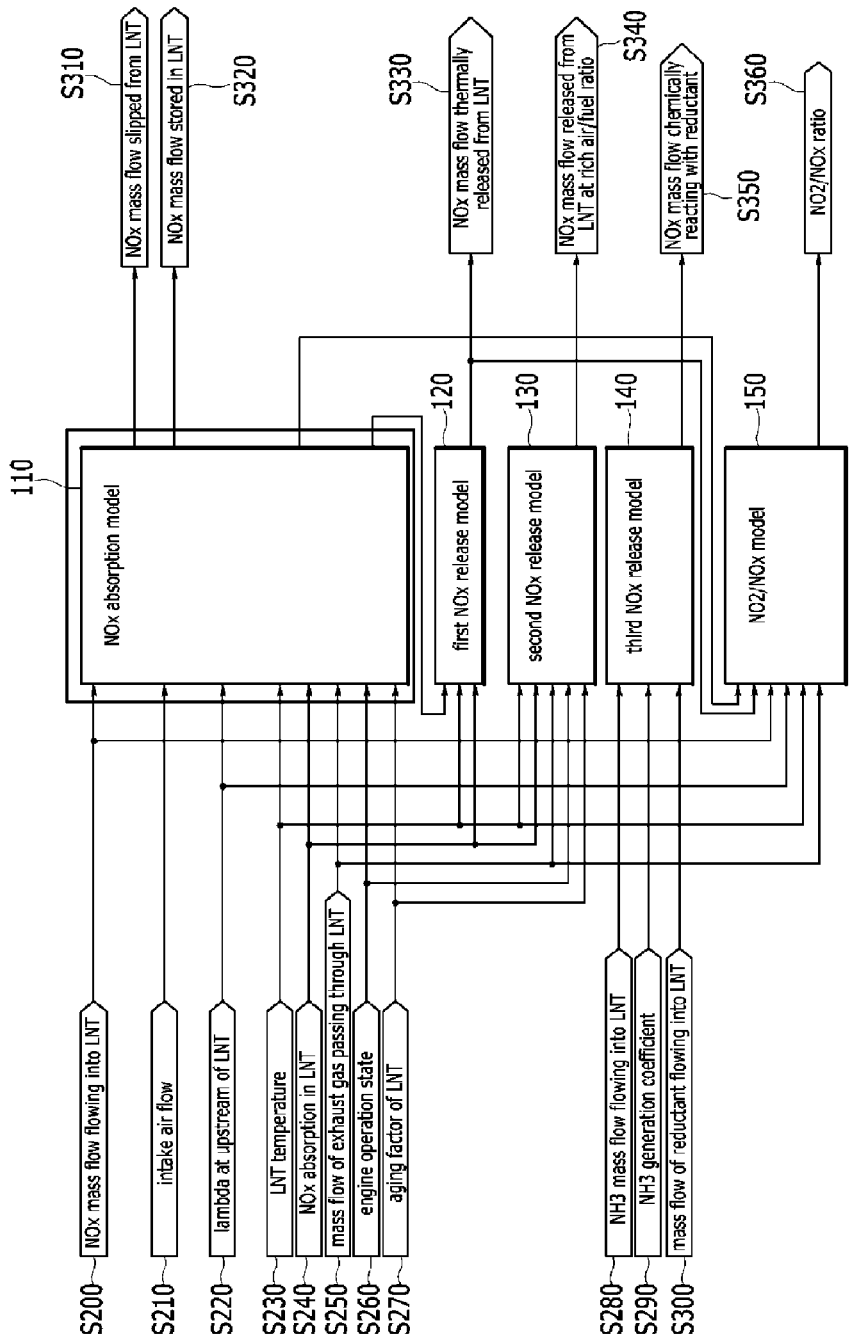
FIG. 3 is a flowchart of a method of calculating a NOx mass adsorbed in an LNT according to an exemplary embodiment of the present disclosure.

As shown in FIG. 3, the NOx mass adsorbed in the LNT 40 is calculated by integrating a value obtained by subtracting a NOx mass flow thermally released from the LNT 40, a NOx mass flow released from the LNT 40 at the rich air/fuel ratio, and a NOx mass flow chemically reacting with reductant at the LNT 40 from a NOx mass flow stored in the LNT 40 in a method of calculating a NOx mass adsorbed in an LNT according to an exemplary embodiment of the present disclosure. For this purpose, the method begins with detecting various data. That is, the controller 70 may detect a NOx mass flow flowing into the LNT 40 at step S200, detect the intake air flow through the intake flowmeter 11 at step S210, detect the lambda at the upstream of the LNT 40 through the first oxygen sensor 72 at step S220, and detect the temperature of the LNT 40 through the first temperature sensor 74 at step S230. Herein, a mass flow means a mass per unit time. The mass is calculated by integrating the mass flow over a time. In addition, the NOx mass flow flowing into the LNT 40 may be calculated from a driving condition of the engine 10 such as the intake air flow, a fuel amount injected into the engine 10, a combustion temperature, and a combustion pressure, a temperature of the exhaust gas, and so on.

In addition, the controller 70 may calculate a NOx mass that was adsorbed in the LNT 40 (hereinafter, it will be called "NOx adsorption in the LNT") at step S240, calculate a mass flow of the exhaust gas passing through the LNT 40 at step S250, detect an engine operation state at step S260, and calculate an aging factor of the LNT 40 at step S270. Herein, the NOx adsorption in the LNT 40 is a value that was previously calculated using the exemplary embodiment of the present disclosure, and may be read from a memory (not shown). In addition, the mass flow of the exhaust gas passing through the LNT 40 is calculated by using an intake air flow (mass) passing through the LNT 40 and a volume of the LNT 40, and the aging factor of the LNT 40 is calculated according to a period of use of the LNT 40.

Further, the controller 70 may calculate a NH3 mass flow generated in the LNT 40 at step S280, calculate a generation coefficient of NH3 that is generated through reduction reaction of NOx at the LNT 40 at step S290, and calculate a mass flow of reductant (it means C3H6 in this specification and claims, but is not limited thereto.) other than the NH3 flowing into the LNT 40 at step S300. Herein, the NH3 mass flow generated in the LNT 40 may be calculated from the driving condition of the engine 10, the temperature of the exhaust gas and the NH3 generation coefficient, the C3H6 mass flow flowing into the LNT 40 may be calculated from the driving condition of the engine 10 and the temperature of the exhaust gas, and the NH3 generation coefficient may be calculated from the temperature and the aging factor of the LNT 40.

After that, the controller 70 may calculate a NOx mass flow slipped from the LNT 40 and a NOx mass flow stored in the LNT 40 at steps S310 and S320 by inputting the NOx mass flow flowing into the LNT 40, the intake air flow, the lambda at the upstream of the LNT 40, the temperature of the LNT 40, the NOx mass that was adsorbed in the LNT 40, the mass flow of the exhaust gas passing through the LNT 40, and the aging factor of the LNT 40 into the NOx adsorption model 110.

In addition, the controller 70 may calculate the NOx mass flow thermally released from the LNT 40 at step S330 by inputting the temperature of the LNT 40 and the NOx adsorption in the LNT 40 into a first NOx release model 120, calculate the NOx mass flow released from the LNT 40 at the rich air/fuel ratio at step S340 by inputting the temperature of the LNT 40, the NOx adsorption in the LNT 40, the mass flow of the exhaust gas passing through the LNT 40, the driving condition of the engine 10, and the aging factor of the LNT 40 into a second NOx release model 130, and calculate the NOx mass flow chemically reacting with the reductant at the LNT 40 at step S350 by inputting the NH3 mass flow generated in the LNT 40, the NH3 generation coefficient, and the C3H6 mass flow flowing into the LNT 40 into a third NOx release model 140.

In addition, the controller 70 may calculate a NO2/NOx ratio at the downstream of the LNT 40 at step S360 by inputting the NOx mass flow slipped from the LNT 40, the NOx mass flow thermally released from the LNT 40, the NOx mass flow flowing into the LNT 40, the lambda at the upstream of the LNT 40, the temperature of the LNT 40, and the mass flow of the exhaust gas passing through the LNT 40 into a NO2/NOx model 150.

Herein, the NOx adsorption model 110, the first, second, and third NOx release models 120, 130, and 140, and the NO2/NOx model 150 may be stored in the controller 70 or a memory connected to the controller 70 in advance through a number of experiments.

Hereinafter, calculation of the NOx mass flow stored in the LNT 40, the NOx mass flow thermally released from the LNT 40, and the NOx mass flow released from the LNT 40 at the rich air/fuel ratio will be described in further detail.

Figure 4:
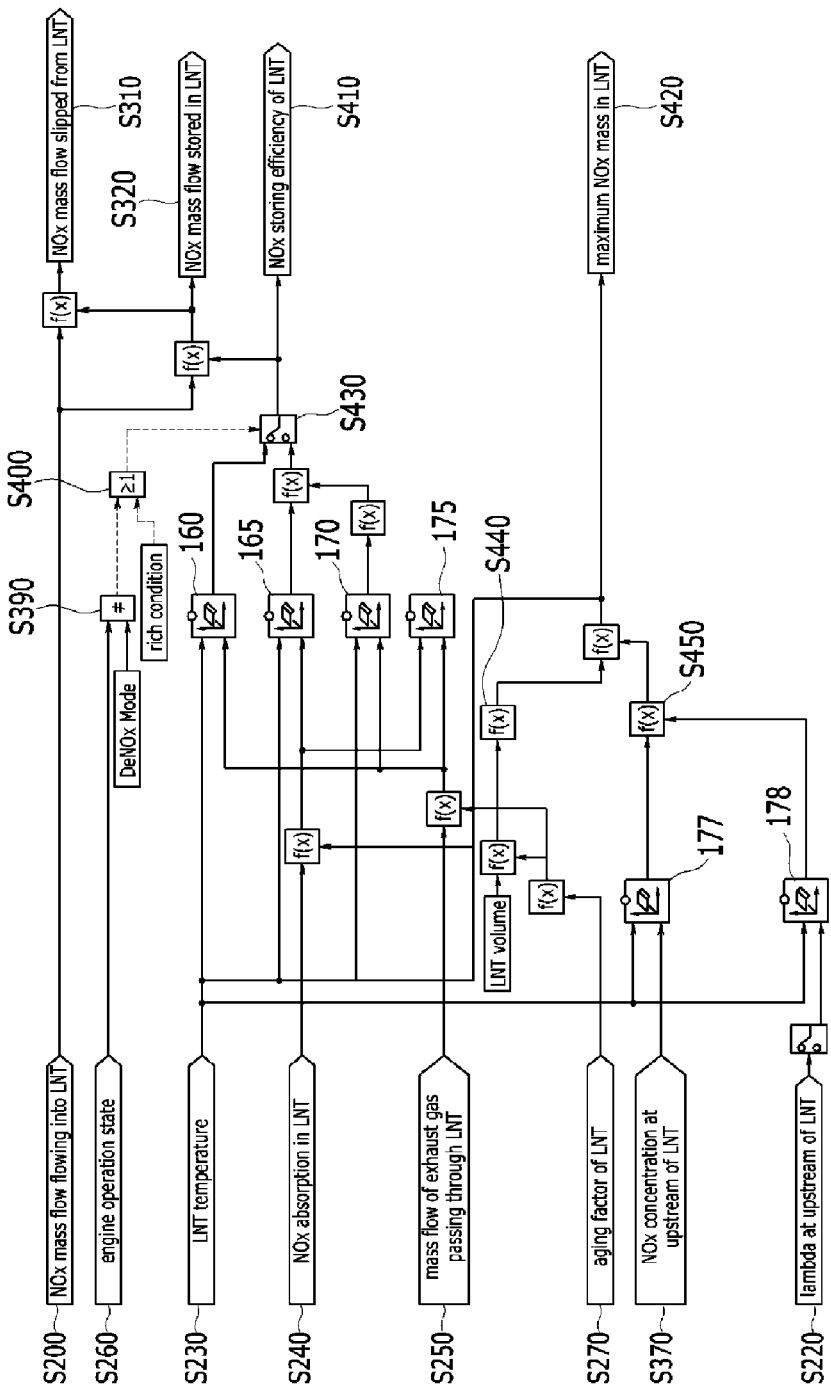
FIG. 4 is a flowchart of calculating a NOx mass flow stored in an LNT according to an exemplary embodiment of the present disclosure.

FIG. 4 is a flowchart of calculating a NOx mass flow stored in an LNT according to an exemplary embodiment of the present disclosure.

Referring to FIG. 4, the NOx mass flow stored in the LNT 40 may be calculated by multiplying the NOx mass flow flowing into the LNT 40 and a NOx storing efficiency of the LNT 40 (it will be calculated at step S410) at the step S320. In addition, the NOx mass flow slipped from the LNT 40 may be calculated by subtracting the NOx mass flow stored in the LNT 40 from the NOx mass flow flowing into the LNT 40 at the step S310.

Herein, the controller 70 respectively may calculate a NOx storing efficiency at the rich air/fuel ratio and a NOx storing efficiency at the lean air/fuel ratio, and select one of the two NOx storing efficiencies according to the engine operation state at step S430. That is, the controller 70 may determine whether the engine operation state is a denitrification (DeNOx) mode at step S390. If the engine operation state is not the DeNOx mode, the controller determines whether a switching condition is satisfied at step S400. Based on the determination result at the step S400, the controller 70 selects one between the NOx storing efficiency at the rich air/fuel ratio and the NOx storing efficiency at the lean air/fuel ratio at step S410.

In addition, the NOx storing efficiency at the rich air/fuel ratio is calculated according to the temperature of the LNT 40 and the mass flow of the exhaust gas passing through the LNT 40. That is, the controller 70 inputs the temperature of the LNT 40 and the mass flow of the exhaust gas passing through the LNT 40 into a first NOx storing efficiency map 160 so as to calculate the NOx storing efficiency at the rich air/fuel ratio. At this time, the mass flow of the exhaust gas passing through the LNT 40 is adjusted according to the aging factor of the LNT 40. That is, the mass flow of the exhaust gas passing through the LNT 40 is adjusted by multiplying the aging factor of the LNT 40 or a value related thereto to the mass flow of the exhaust gas passing through the LNT 40, and the adjusted mass flow of the exhaust gas is input to the first NOx storing efficiency map 160.

In addition, the NOx storing efficiency at the lean air/fuel ratio may be calculated according to the temperature of the LNT 40 and a relative NOx adsorption of the LNT 40. That is, the controller 70 inputs the temperature of the LNT 40 and the relative NOx adsorption of the LNT 40 into a second NOx storing efficiency map 165 so as to calculate the NOx storing efficiency at the lean air/fuel ratio. Herein, the relative NOx adsorption of the LNT 40 is calculated as a ratio of the NOx adsorption in the LNT 40 to a maximum NOx mass that can be adsorbed in the LNT 40 (it will be calculated at step S420 and will be called "maximum NOx adsorption in the LNT"). When calculating the maximum NOx adsorption in the LNT 40, the aging factor of the LNT 40 is considered. That is, an effective volume of the LNT 40 is calculated using a volume of the LNT 40 and the aging factor of the LNT 40 at step S440. In addition, the controller 70 calculates a NOx concentration at the upstream of the LNT 40 at step S370, calculates a NOx adsorption per unit volume by inputting the NOx concentration at the upstream of the LNT 40 and the temperature of the LNT 40 into a normal NOx adsorption map 177, and calculates a correction coefficient by inputting the temperature of the LNT 40 and the upstream lambda into a normal NOx adsorption correction map 178. The controller 70 calculates a maximum NOx adsorption per unit volume from the NOx adsorption per unit volume and the correction coefficient at step S450, and calculates the maximum NOx adsorption using the maximum NOx adsorption per unit volume and the effective volume of the LNT 40 at step S420.

The NOx storing efficiency at the lean air/fuel ratio is first corrected according to the temperature of the LNT 40 and the mass flow of the exhaust gas passing through the LNT 40, and is secondly corrected according to the NOx adsorption and the mass flow of the exhaust gas passing through the LNT 40. That is, the controller 70 calculates a first correction coefficient by inputting the temperature of the LNT 40 and the mass flow of the exhaust gas passing through the LNT 40 into a first correction map 170, calculates a second correction coefficient by inputting the NOx adsorption and the mass flow of the exhaust gas passing through the LNT 40 into a second correction map 175, and calculates the NOx storing efficiency at the lean air/fuel ratio finally by correcting the NOx storing efficiency at the lean air/fuel ratio by the first and second correction coefficients. Herein, variables input into the first and second correction maps 170 and 175 may be adjusted by the aging factor of the LNT 40.

The first and second NOx storing efficiency maps 160 and 165, the normal NOx adsorption map 177, the normal NOx adsorption correction map 178, and the first and second correction maps 170 and 175 are stored in the controller 70 or a memory connected to the controller 70 in advance as a result of a number of experiments.

Figure 5:
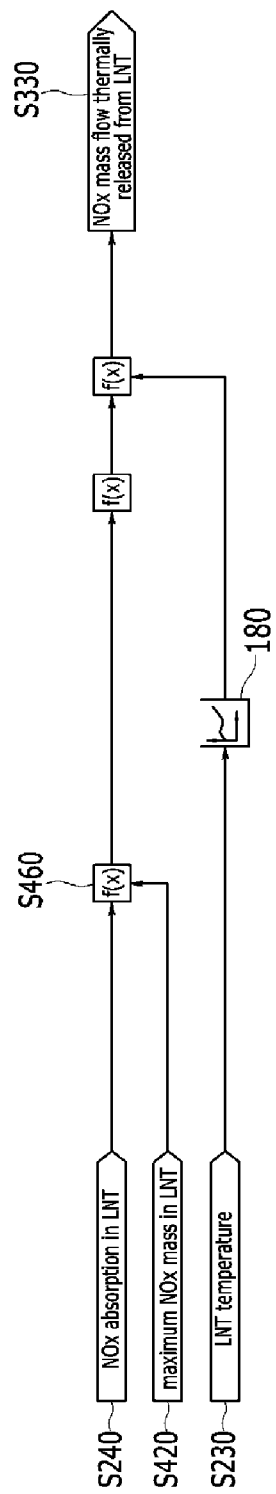
FIG. 5 is a flowchart of calculating a NOx mass flow thermally released from an LNT according to an exemplary embodiment of the present disclosure.

FIG. 5 is a flowchart of calculating a NOx mass flow thermally released from an LNT according to an exemplary embodiment of the present disclosure.

Referring to FIG. 5, the NOx mass flow thermally released from the LNT 40 is calculated only at the lean air/fuel ratio. For this purpose, the controller 70 calculates an excess NOx adsorption at step S460 by subtracting the NOx mass currently adsorbed in the LNT 40 from the maximum NOx adsorption in the LNT 40, and calculates a mass flow of the excess NOx adsorption by dividing the excess NOx adsorption by a sampling time. In addition, the controller 70 calculates a thermal release characteristic by inputting the temperature of the LNT 40 into a first release map 180. After that, the controller 70 calculates the NOx mass flow thermally released from the LNT 40 by using the mass flow of the excess NOx adsorption and the thermal release characteristic at the step S330.

Figure 6:
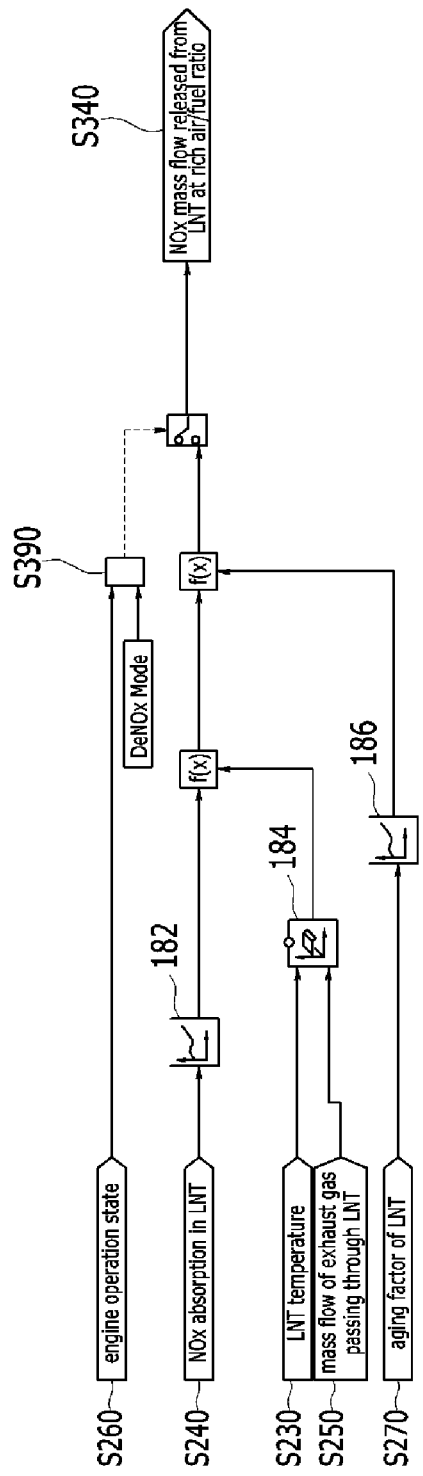
FIG. 6 is a flowchart of calculating a NOx mass flow released from an LNT at a rich air/fuel ratio according to an exemplary embodiment of the present disclosure.

FIG. 6 is a flowchart of calculating a NOx mass flow released from an LNT at a rich air/fuel ratio according to an exemplary embodiment of the present disclosure.

Referring to FIG. 6, the NOx mass flow released from the LNT 40 at the rich air/fuel ratio is calculated only in the denitrification (DeNOx) mode. For this purpose, the controller 70 determines whether the engine operation state is the DeNOx mode at step S390, and stores the NOx mass flow released from the LNT 40 at the rich air/fuel ratio in a memory if the engine operation state is the DeNOx mode.

In the DeNOx mode, the controller 70 calculates a mass flow of basic NOx release by inputting the NOx adsorption in the LNT 40 into a second release map 182. After that, the controller first corrects the mass flow of basic NOx release according to the temperature of the LNT and the mass flow of the exhaust gas passing through the LNT 40, and secondly corrects the mass flow of basic NOx release according to the aging factor of the LNT 40. That is, the controller 70 calculates a third correction coefficient by inputting the temperature of the LNT and the mass flow of the exhaust gas passing through the LNT into a third correction map 184, and calculates a fourth correction coefficient by inputting the aging factor of the LNT 40 into a fourth correction map 186. After that, the controller 70 calculates the NOx mass flow released from the LNT 40 at the rich air/fuel ratio by using the mass flow of basic NOx release and the third and fourth correction coefficients at the step S340.

The controller 70 uses a model using C3H6 as the reductant in order to calculate the NOx mass flow chemically reacting with the reductant at the LNT 40. That is, the following chemical reaction equations may be used.

<NOx mass reduced by reacting with HC>

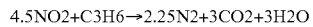

4.5NO2+C3H6→2.25N2+3CO2+3H2O

<NH3 mass generated from HC>

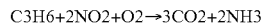

C3H6+2NO2+O2→3CO2+2NH3

It can be known from the above equations that a part of the C3H6 mass flow flowing into the LNT 40 is used to reduce the NOx and the other part of the C3H6 mass flow flowing into the LNT 40 is used to generate the NH3. Therefore, the controller 70 calculates the NOx mass flow reduced by the C3H6 by using the C3H6 mass flow flowing into the LNT 40 and the NH3 generation coefficient. In addition, the controller 70 calculates the NOx mass flow reduced by the NH3 by using the NH3 mass flow generated by the C3H6. After that, the controller 70 calculates the NOx mass flow reacting with the reductant at step S350 by summing up the NOx mass flow reduced by the C3H6 and the NOx mass flow reduced by the NH3.

While this disclosure has been described in connection with what is presently considered to be practical exemplary embodiments, it is to be understood that the disclosure is not limited to the disclosed embodiments, but, on the contrary, is intended to cover various modifications and equivalent arrangements included within the spirit and scope of the appended claims.

What is claimed is:

1. A method of calculating a nitrogen oxide (NOx) mass adsorbed in a lean NOx trap (LNT) of an exhaust purification device, wherein the LNT is mounted at an exhaust pipe, and adsorbs NOx contained in an exhaust gas at a lean air/fuel ratio, releases the adsorbed NOx at a rich air/fuel ratio, and reduces the NOx contained in the exhaust gas or the released NOx using reductant including carbon or hydrogen contained in the exhaust gas, and wherein the method is performed by a controller to control adsorption and release of the NOx by controlling an air/fuel ratio according to the NOx mass adsorbed in the LNT and a temperature of the exhaust gas, the method comprising:
   calculating a NOx mass flow stored in the LNT;
   calculating a NOx mass flow thermally released from the LNT;
   calculating a NOx mass flow released from the LNT at the rich air/fuel ratio;
   calculating a NOx mass flow chemically reacting with the reductant at the LNT; and
   integrating a value obtained by subtracting the NOx mass flow thermally released from the LNT, the NOx mass flow released from the LNT at the rich air/fuel ratio, and the NOx mass flow chemically reacting with the reductant at the LNT from the NOx mass flow stored in the LNT,
   wherein the step of calculating a NOx mass flow stored in the LNT comprises:
   calculating a NOx mass flow flowing into the LNT;
   calculating a NOx storing efficiency of the LNT; and
   calculating a NOx mass flow adsorbed in the LNT by multiplying the NOx mass flow flowing into the LNT and the NOx storing efficiency of the LNT, and wherein a NOx storing efficiency at the rich air/fuel ratio and a NOx storing efficiency at the lean air/fuel ratio are calculated respectively at the step of calculating a NOx storing efficiency of the LNT.

2. The method of claim 1, wherein the NOx storing efficiency at the rich air/fuel ratio is calculated according to a temperature of the LNT and a mass flow of the exhaust gas passing through the LNT.

3. The method of claim 1, wherein the NOx storing efficiency at the lean air/fuel ratio is calculated according to a temperature of the LNT and a relative NOx adsorption of the LNT.

4. The method of claim 3, wherein the NOx storing efficiency at the lean air/fuel ratio is first corrected according to the temperature of the LNT and the mass flow of the exhaust gas passing through the LNT, and is secondly corrected according to a NOx adsorption in the LNT and the mass flow of the exhaust gas passing through the LNT.

5. The method of claim 1, wherein the NOx storing efficiency at the rich air/fuel ratio and the NOx storing efficiency at the lean air/fuel ratio are calculated by taking into account an aging factor of the LNT.

6. The method of claim 1, wherein the calculating a NOx mass flow thermally released from the LNT comprises: calculating an excess NOx adsorption that exceeds a maximum NOx adsorption of the LNT; calculating a mass flow of the excess NOx adsorption by dividing the excess NOx adsorption by a sampling time; and multiplying a thermal release characteristic according to the temperature of the LNT to the mass flow of the excess NOx adsorption.

7. The method of claim 1, wherein the step of calculating a NOx mass flow released from the LNT at the rich air/fuel ratio comprises: calculating a mass flow of a basic NOx release according to a NOx adsorption at a denitrification (DeNOx) mode; first correcting the mass flow of the basic NOx release according to the temperature of the LNT and the mass flow of the exhaust gas passing through the LNT; and secondly correcting the firstly corrected mass flow of the basic NOx release according to an aging factor of the LNT.

8. The method of claim 1, wherein the NOx mass flow chemically reacting with the reductant at the LNT is calculated through a model using C3H6 as the reductant.

9. An exhaust purification device comprising:
an engine including an injector for injecting fuel thereinto, generating power by burning mixture of air and the fuel, and exhausting an exhaust gas generated at combustion process to the exterior thereof through an exhaust pipe;
a lean NOx trap (LNT) mounted on the exhaust pipe, for adsorbing nitrogen oxide (NOx) contained in the exhaust gas at a lean air/fuel ratio, for releasing the adsorbed nitrogen oxide at a rich air/fuel ratio, and for reducing the nitrogen oxide contained in the exhaust gas or the released nitrogen oxide using reductant including carbon or hydrogen contained in the exhaust gas; and
a controller for controlling adsorption and release of the NOx by controlling air/fuel ratio according to the NOx adsorbed in the LNT and a temperature of the exhaust gas,
wherein the controller calculates a NOx mass adsorbed in the LNT by integrating a value obtained by subtracting a NOx mass flow thermally released from the LNT, a NOx mass flow released from the LNT at the rich air/fuel ratio, and a NOx mass flow chemically reacting with reductant at the LNT from a NOx mass flow stored in the LNT, and
wherein the controller calculates the NOx mass flow stored in the LNT by multiplying NOx mass flow flowing into the LNT and a NOx storing efficiency of the LNT.

10. The exhaust purification device of claim 9, wherein the controller calculates a NOx storing efficiency at the rich air/fuel ratio and a NOx storing efficiency at the lean air/fuel ratio, respectively.

11. The exhaust purification device of claim 10, wherein the controller calculates the NOx storing efficiency at the rich air/fuel ratio according to the temperature of the LNT and a mass flow of the exhaust gas passing through the LNT.

12. The exhaust purification device of claim 10, wherein the controller calculates the NOx storing efficiency at the lean air/fuel ratio according to the temperature of the LNT and a relative NOx adsorption of the LNT.

13. The exhaust purification device of claim 12, wherein the controller first corrects the NOx storing efficiency at the lean air/fuel ratio according to the temperature of the LNT and the mass flow of the exhaust gas passing through the LNT, and secondly corrects the NOx storing efficiency at the lean air/fuel ratio according to a NOx adsorption in the LNT and the mass flow of the exhaust gas passing through the LNT.

14. The exhaust purification device of claim 10, wherein the controller calculates a NOx storing efficiency at the rich air/fuel ratio and a NOx storing efficiency at the lean air/fuel ratio by considering the aging factor of the LNT.

15. The exhaust purification device of claim 9, wherein the controller calculates a mass flow of an excess NOx adsorption by dividing an excess NOx adsorption that exceeds a maximum NOx adsorption in the LNT by a sampling time, and calculates the NOx mass flow thermally released from the LNT by multiplying a thermal release characteristic according to the temperature of the LNT to the mass flow of the excess NOx adsorption.

16. The exhaust purification device of claim 9, wherein the controller calculates the NOx mass flow released from the LNT at the rich air/fuel ratio by first correcting a mass flow of a basic NOx release according to a NOx adsorption at a denitrification (DeNOx) mode according to the temperature of the LNT and the mass flow of the exhaust gas passing through the LNT, and secondly correcting the mass flow of the basic NOx release according to the aging factor of the LNT.

17. The exhaust purification device of claim 9, wherein the controller calculates the NOx mass flow chemically reacting with the reductant at the LNT through a model using C3H6 as the reductant.

\* \* \* \* \*